United States Patent
Troiani et al.

(10) Patent No.: US 12,289,296 B2
(45) Date of Patent: Apr. 29, 2025

(54) SECURED STORAGE AND PLAYBACK OF RECORDED COLLABORATION SESSION VIDEOS

(71) Applicant: Cisco Technology, Inc., San Jose, CA (US)

(72) Inventors: Chiara Troiani, Cheseaux-Lausanne (CH); Aviva Vaknin, Jerusalem (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 244 days.

(21) Appl. No.: 18/181,021

(22) Filed: Mar. 9, 2023

(65) Prior Publication Data
US 2024/0305612 A1    Sep. 12, 2024

(51) Int. Cl.
*H04L 9/40*      (2022.01)
*G06F 21/62*     (2013.01)
*H04L 12/18*     (2006.01)

(52) U.S. Cl.
CPC ...... *H04L 63/0428* (2013.01); *G06F 21/6227* (2013.01); *H04L 12/1831* (2013.01); *H04L 63/062* (2013.01)

(58) Field of Classification Search
CPC ............. G06F 21/6227; H04L 63/0428; H04L 63/062; H04L 12/1831
USPC ........................................................ 726/28
See application file for complete search history.

(56) References Cited

U.S. PATENT DOCUMENTS 5,373,316 A  * 12/1994  Ishinabe ................ H04N 7/147
                                           379/93.21
8,416,274 B2 *  4/2013  Chang ................. H04M 7/0075
                                           370/352
9,032,461 B2 *  5/2015  Tucker .................. H04N 7/148
                                           725/109

(Continued)

FOREIGN PATENT DOCUMENTS

WO       2004012378 A2     2/2004

OTHER PUBLICATIONS

Padilla-Lopez, J, et al., "Visual Privacy Protection Methods: A Survey," ScienceDirect, Expert Systems with Applications, vol. 42, Issue 9, https://www.sciencedirect.com/science/article/abs/pii/S0957417415000561, Jun. 1, 2015, 47 pages.

(Continued)

*Primary Examiner* — Amare F Tabor
(74) *Attorney, Agent, or Firm* — Edell, Shapiro & Finnan, LLC

(57) ABSTRACT

A method, computer system, and computer program product are provided for securely controlling playback of a recorded collaboration session. A plurality of video feeds is received from a plurality of client devices of users participating in a video meeting, wherein each video feed is encoded by each client device in an encoded format that distorts the video feed, wherein a unique key is used by each client device to encode the video feed. The plurality of video feeds are stored in the encoded format. A request is received to view a stored video feed, wherein the request includes the unique key used to encode the stored video feed. In response to determining that the requesting entity is authorized by a user of the stored video feed to view the stored video feed, the stored video feed is decoded and provided to the requesting entity.

20 Claims, 6 Drawing Sheets

(56) References Cited

U.S. PATENT DOCUMENTS

| | | | | |
|---|---|---|---|---|
| 10,515,227 | B2* | 12/2019 | Radich | H04L 9/30 |
| 10,630,663 | B1* | 4/2020 | Kasabwala | H04L 9/0861 |
| 2001/0014206 | A1* | 8/2001 | Artigalas | H04N 21/4335 |
| | | | | 348/E7.063 |
| 2004/0228410 | A1* | 11/2004 | Ameres | H04N 19/139 |
| | | | | 375/E7.113 |
| 2005/0254440 | A1* | 11/2005 | Sorrell | H04L 65/1101 |
| | | | | 348/14.08 |
| 2022/0239655 | A1 | 7/2022 | Lyer et al. | |
| 2022/0247732 | A1 | 8/2022 | Krohn | |
| 2022/0377056 | A1 | 11/2022 | Chawla et al. | |

OTHER PUBLICATIONS

Cheung, S., et al., "Managing Privacy Data in Pervasive Camera Networks," 15th IEEE International Conference on Image Processing, San Diego, CA, https://ieeexplore.ieee.org/abstract/document/4712095, Oct. 2008, 4 pages.

* cited by examiner

SECURED STORAGE AND PLAYBACK OF RECORDED COLLABORATION SESSION VIDEOS

TECHNICAL FIELD

The present disclosure relates generally to collaboration sessions, and more specifically, to securely storing and controlling the playback of recorded collaboration session video.

BACKGROUND

A collaboration session, also referred to as a teleconference, videoconference, online meeting or webinar, is a form of teleconferencing in which multiple participants can exchange audio and/or video, present documents or other content to each other, and/or perform other operations in order to remotely collaborate on a task. Collaboration sessions are frequently recorded for later playback in order to memorialize the meeting, to comply with public record requirements, and the like. However, some users may not be comfortable with their video data being permanently stored.

DETAILED DESCRIPTION

Overview

Figure 1:
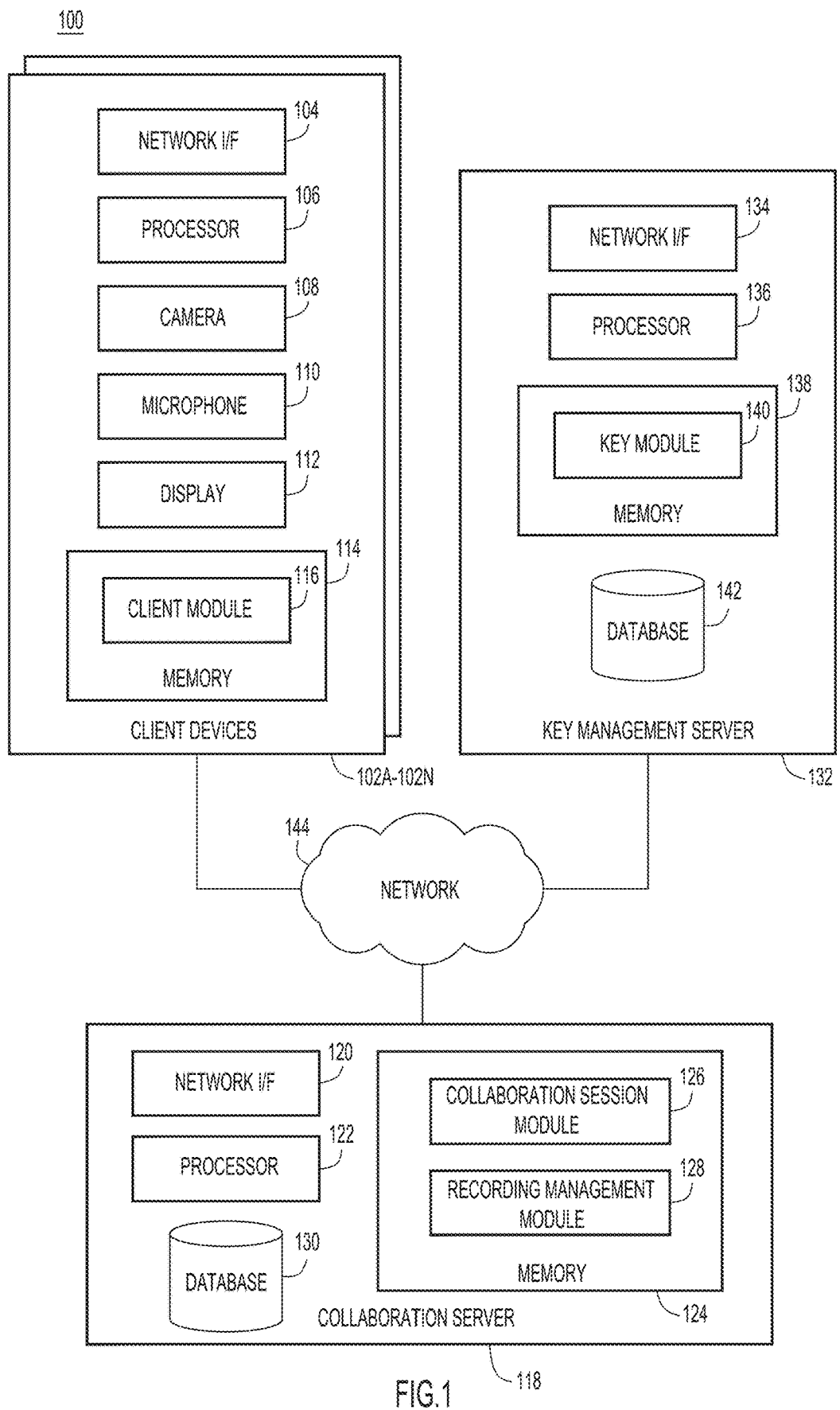
FIG. 1 is a block diagram of a networking environment that supports collaboration sessions, as well as storing and playing recorded collaboration sessions, according to an example embodiment.

According to one embodiment, techniques are provided for securely controlling playback of recorded collaboration sessions. A plurality of video feeds is received, at a server, from a plurality of client devices of users participating in a video meeting, wherein each video feed is encoded by each client device in an encoded format that distorts the video feed. A unique key is used by each client device to encode the video feed. The plurality of video feeds are decoded by the server using each respective unique key, and the decoded plurality of video feeds are provided to the plurality of client devices during the video meeting. The plurality of video feeds are stored in the encoded format. A request is received from a requesting entity to view a stored video feed of the plurality of video feeds, wherein the request includes the unique key used to encode the stored video feed. In response to determining that the requesting entity is authorized by a user of the stored video feed to view the stored video feed, the stored video feed is decoded and a decoded stored video feed obtained by decoding the stored video feed is provided to the requesting entity.

Example Embodiments

During a collaboration session, users may communicate via audio, video, and/or text. Typically, collaboration session applications provide various features to facilitate virtual communication, such as screen sharing, file sharing, real-time chat, and recording. In particular, collaboration sessions may be recorded for future usage so that users do not need to take notes during the collaboration session.

However, recording collaboration sessions may cause some users to feel uncomfortable for a variety of reasons. In many jurisdictions, there is a right to be forgotten, which is a legal concept that enables individuals to request the removal of their personal information from databases and other online platforms. This right is based on the idea that individuals have the right to control their personal data and to have outdated, irrelevant, or inaccurate information about themselves removed from public view.

In the context of recorded collaboration sessions, users may desire to invoke their right to be forgotten by requesting to delete their recorded video data (and/or anonymize their audio data). Conventional approaches to managing users' recorded collaboration sessions may require manual deletion of user content in response to a user withdrawing his or her consent for the data to be stored. However, manual management of user data can be time-consuming and does not guarantee that a user's wishes are fulfilled.

Present embodiments provide a approach to securely storing a recorded collaboration session in a manner that enables each user to retain control of the user's own data in the case that the user desires to invoke the right to be forgotten. In particular, when video data is obtained at a user's endpoint device, the video data may be encoded in a manner that obfuscates (e.g., scrambles) the user's video data to conceal the user's appearance and/or other details. The video data can be decoded when provided to other participants during the collaboration session, but when the collaboration session is recorded, the encoded portion of the user's data is stored. Thus, during a subsequent playback, a viewer needs to decode the user's video data in order to view that user, and decoding may only be performed with the user's authorization. Alternatively, video is sent from each user device to a collaboration server without any obfuscation and the collaboration server obfuscates each video stream received from a user device, with the user's unique key, when the collaboration session is being recorded.

Thus, present embodiments improve the field of video conferencing and data storage by enhancing user privacy in a manner that provides a user with control over how the user's data is used. Present embodiments provide the practical application of enabling a user to invoke the right to be forgotten without making a recorded collaboration session inaccessible. In particular, since the user's video data may merely be scrambled, a recorded collaboration session can still be played back to enable a viewer to extract meaning from the recorded data while preserving the privacy of any individuals who do not consent for their data to be made available.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. FIG. 1 is a block diagram of a networking environment 100 that may support collaboration sessions, as well as storing and playing recorded collaboration sessions, according to an example embodiment. As depicted, networking environment 100 includes a plurality of client devices 102A-102N, a collaboration server 118, a key management server 132, and a network 144. It is to be understood that the functional division among components of networking environment 100 have been chosen for purposes of explaining various embodiments and is not to be construed as a limiting example.

Client devices 102A-120N are endpoint user devices and each may include a network interface (I/F) 104, at least one processor 106, a camera 108, a microphone 110, a display 112, and memory 114, which stores instructions for a client module 116. In various embodiments, each client device 102A-120N may include a rack-mounted server, laptop, desktop, smartphone, tablet, or any other programmable electronic device capable of executing computer readable program instructions. Network interface 104 enables components of each client device 102A-102N to send and receive data over a network, such as network 144. Camera 108 may include any video capture device to obtain imagery of a user, such as a webcam, and microphone 110 may include any transducer for converting capturing audio and converting the audio to an electrical signal. Display 112 may include any electronic device capable of presenting information in a visual form. For example, display 112 may be a liquid crystal display (LCD), a cathode ray tube (CRT) display, a light-emitting diode (LED) display, an electronic ink display, a virtual reality or augmented reality display, and the like. In general, client devices 102A-102N may be used by a user to participate in a collaboration session and/or to view recorded collaboration sessions.

Client module 116 may include one or more modules or units to perform various functions of the embodiments described below. Client module 116 may be implemented by any combination of any quantity of software and/or hardware modules or units, and may reside within memory 114 of any of client devices 102A-102N for execution by a processor, such as processor 106.

Client module 116 enables a user of each client device 102A-102N to participate in a collaboration session and/or to view a recorded collaboration session. Client module 116 may enable different client devices 102A-102N to exchange data with each other via a network (e.g., network 144). In various embodiments, client module 116 may exchange data comprising text, video, audio, images, or any combinations thereof. Thus, client module 116 may act as a client for a collaboration session, with collaboration session module 126 of collaboration server 118 functioning as a host or server.

In some embodiments, when client module 116 captures video and/or audio data of a user, client module 116 processes the data before sending via network 144 so that the data is secured in accordance with present embodiments. In particular, the video and/or audio data can be encoded so that the user's video and/or audio data is encrypted, scrambled, or otherwise obfuscated to render the data unintelligible or to conceal the user's identity. The user may retain control of one or more keys that are required to decode the video and/or audio data, thus giving the user control over their data. Scrambling may refer to an analog encoding of data, whereas encryption may be used to digitally encode the data. In some embodiments, the user's video data is encoded in a manner that renders the entire video feed unintelligible. In other embodiments, the user's video data is encoded in a manner that anonymizes the user's identity, such as by blurring or pixelating the user's face and/or other body portions. Additionally or alternatively, the user's audio data may be encoded. In some embodiments, the user's audio data is encoded in a manner that renders the audio data unintelligible. In some embodiments, the user's audio data is encoded in manner that anonymizes the user's voice (e.g., by adjusting the pitch and distorting the voice). However, regardless of whether the audio data is encoded or not, in some embodiments, a text transcript of the audio data may be generated and included in a recorded communication session.

Client module 116 may encode data using a unique key that is associated with the user. In various embodiments, a same key may be used for encoding each of a user's collaboration sessions, or different unique keys may be used for each individual collaboration session. In some embodiments, different unique keys may be used to separately encode the video data and the audio data. The key may be retained by a user of a client device (e.g., stored and managed locally by a user), or the key may be provided to a key management service (e.g., key management server 132) through which the user may authenticate requests to decode user data using the key. In some embodiments, the key is temporarily provided to collaboration server 118 to decode a user's video data and/or audio data during a collaboration session; after a collaboration session ends, collaboration server 118 may securely delete all copies of user keys.

Collaboration server 118 includes a network interface (I/F) 120, at least one processor 122, memory 124, and a database 130. Memory 124 may store instructions for a collaboration session module 126 and a recording management module 128. In various embodiments, collaboration server 118 may include a rack-mounted server, laptop, desktop, smartphone, tablet, or any other programmable electronic device capable of executing computer readable program instructions. Network interface 120 enables components of collaboration server 118 to send and receive data over a network, such as network 144. In general, collaboration server 118 hosts collaboration sessions by facilitating the exchange of data, including media content (e.g., user video data and/or audio data) that is exchanged during collaboration sessions. Collaboration server 118 may also record collaboration sessions and store recorded collaboration sessions so that users can play back the previously-recorded collaboration sessions.

Collaboration session module 126 and/or recording management module 128 may include one or more modules or units to perform various functions of the embodiments described below. Collaboration session module 126 and/or recording management module 128 may be implemented by any combination of any quantity of software and/or hardware modules or units, and may reside within memory 124 of collaboration server 118 for execution by a processor, such as processor 122.

Collaboration session module 126 may host collaboration sessions by facilitating the exchange of data between client devices 102A-102N via their client module 116. The collaboration sessions may include video data (e.g., data gathered by a user's camera 108), audio data (e.g., data gathered by a user's microphone 110), and/or other forms of data (e.g., text, graphical data, slideshows, etc.). Collaboration session module 126 may receive encoded data from each client device 102A-102N as well as a unique key corresponding to each client device 102A-102N. Collaboration session module 126 may decode the received encoded data using the unique keys prior to transmitting to participants in a collaboration session so that when the collaboration session is live, each participant may see the others' data in a decoded, intelligible format. In some embodiments, collaboration session module 126 may delete the unique keys at the end of a collaboration session. As explained briefly above, the collaboration server may receive unobfuscated user video streams for an ongoing collaboration session, and may encode or otherwise obfuscate the video stream received from a user, with the user's unique key, when the collaboration session is being recorded.

Recording management module 128 may record collaboration session data so that collaboration sessions can be subsequently replayed. The collaboration session data may be stored to a non-volatile storage medium (e.g., database 130) that is local to collaboration server 118 or the data may be stored to a remote platform (e.g., a cloud storage platform). The data that is stored by recording management module 128 may correspond to the encoded user data that is received by collaboration server 118. Thus, recording management module 128 may not store data that is decoded by collaboration session module 126 during the collaboration session. However, in some embodiments, recording management module 128 may nevertheless store decoded data, upon which recording management module 128 may apply an additional layer of encryption or other security mechanism prior to storing.

Recording management module 128 may also respond to requests to view recorded collaboration sessions. A requesting entity (e.g., a user of any of client devices 102A-102N) may request to view a collaboration session, and in response, recording management module 128 may make the data available. The requesting entity may provide, or cause to be provided, one or more unique keys for decoding any encoded data of a recorded collaboration session. A collaboration session may be viewed despite a requesting entity not having some or all of the unique keys necessary to decode each individual user's data in the recorded collaboration session. For example, if some users have invoked their right to be forgotten and therefore have deleted their unique keys, any user interface windows showing those users' data will instead show the encoded data. It is to be understood that the functions of the recording management module may be implemented on a separate server or bank of servers from the collaboration server.

Database 130 may include any non-volatile storage media known in the art. For example, database 130 can be implemented with a tape library, optical library, one or more independent hard disk drives, or multiple hard disk drives in a redundant array of independent disks (RAID). Similarly, data stored in database 130 may conform to any suitable storage architecture known in the art, such as a file, a relational database, an object-oriented database, and/or one or more tables. In general, database 130 may store recorded collaboration sessions, and in particular, recorded collaboration sessions in which the video and/or audio data of one or more is stored in an encoded format.

Key management server 132 includes a network interface (I/F) 134, at least one processor 136, memory 138, and a database 142. Memory 138 may store instructions for a key module 140. In various embodiments, key management server 132 may include a rack-mounted server, laptop, desktop, smartphone, tablet, or any other programmable electronic device capable of executing computer readable program instructions. Network interface 134 enables components of key management server 132 to send and receive data over a network, such as network 144. In general, key management server 132 may receive and store unique keys of users that are used to encode user data in accordance with present embodiments.

Key module 140 may include one or more modules or units to perform various functions of the embodiments described below. Key module 140 may be implemented by any combination of any quantity of software and/or hardware modules or units, and may reside within memory 138 of key management server 132 for execution by a processor, such as processor 136.

Key module 140 may manage unique keys on behalf of users of client devices 102A-102N. In particular, key module 140 may receive unique keys and store those keys (e.g., in database 142, etc.). Each stored key may be associated with a particular user, who can authenticate with key management server 132 when a requesting entity requests to access a unique key to decode user data. Users may authenticate with key module 140 using any authentication mechanism, such as logging in via an account, using a two-factor authentication scheme, and the like. In one embodiment, a request to access a unique key may be received from a requesting entity, either directly or by way of collaboration server 118; in response, key management server 132 may send a request to a client device of the user associated with the unique key, and the user may authenticate with key management server 132 and either permit or deny the request. Stored unique keys may also include metadata that defines permission for each key. In some embodiments, a user may permit access to a unique key by identifying any requesting entities that are permitted to use the key, or the user may permit access to all requesting entities. A user may define temporal restrictions for unique keys as well, such as temporarily granting access or granting access for an undefined period of time (e.g., unless and until the user revokes permission). A user may also indicate that the user has invoked the user's right to be forgotten, at which point, key module 140 may delete the relevant unique key(s), rending the user's data permanently encoded. In some embodiments, a stored unique key may be configured to be deleted after a predetermined amount of time, unless the user authenticates with key management server 132. Thus, for example, if a user is deceased, the user's unique key(s) will eventually be automatically deleted, causing the user's data to remain permanently encoded.

Database 142 may include any non-volatile storage media known in the art. For example, database 142 can be implemented with a tape library, optical library, one or more independent hard disk drives, or multiple hard disk drives in a redundant array of independent disks (RAID). Similarly, data stored in database 142 may conform to any suitable storage architecture known in the art, such as a file, a relational database, an object-oriented database, and/or one or more tables. In general, database 142 may store unique keys of users, along with metadata indicating user associations (e.g., the user to whom the key belongs), key use permissions (e.g., who can use the key, when the key may be used, etc.), and other data.

Network 144 may include a local area network (LAN), a wide area network (WAN) such as the Internet, or a combination of the two, and includes wired, wireless, or fiber optic connections. In general, network 144 can be any combination of connections and protocols known in the art that will support communications between client devices 102A-102N, collaboration server 118, and/or key management server 132 via their respective network interfaces in accordance with the described embodiments.

Figure 2:
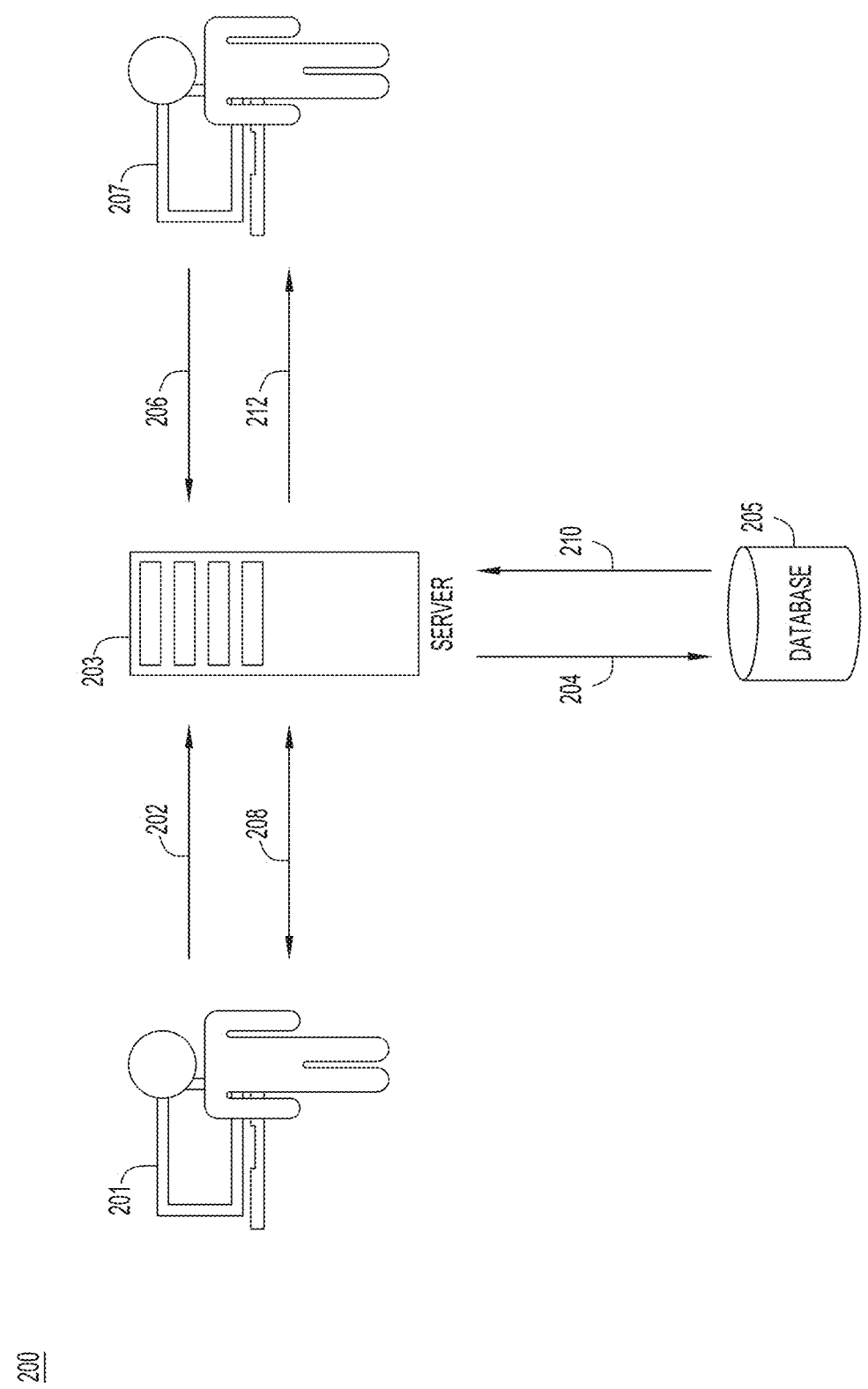
FIG. 2 is a diagram depicting a data flow for securely storing and playing back a recorded collaboration session video, according to an example embodiment.

With reference now to FIG. 2, a diagram is shown depicting a data flow 200 for securely storing and playing back a recorded collaboration session video, according to an example embodiment. As depicted, data flow 200 occurs between a user device 201, a server 203, a database 205, and a requesting entity 207.

Initially, a user of user device 201 participates in a collaboration session. The user's video and/or audio data may be encoded using a unique key prior to transmitting to server 203 at operation 202. Alternatively, the user's video and/or audio data is transmitted without such encoding, as described above. Server 203 may temporarily use the unique key to decode the user's encoded data during the collaboration session for relaying to other users during the collaboration session. Additionally, when recording the collaboration session, the server 203 may store user data (video and audio stream data for each user) in its encoded format in database 205 at operation 204. The unique key may be retained by the user and/or stored elsewhere, such as a key management service.

After a collaboration session, requesting entity 207 may request to view the recorded collaboration session. For example, requesting entity 207 may be another participant in the collaboration session, or another user, who desires to play back at least a portion of the recorded collaboration session. Requesting entity 207 may transmit a request to server 203 to access the recorded collaboration session at operation 206. In response, server 203 may determine whether requesting entity 207 is authorized to access the recorded collaboration session by authenticating with the user at operation 208. In some embodiments, the user provides an ad hoc authorization whenever requesting entity 207 submits a request. In other embodiments, the user of user device 201 may define access criteria based on the time, identity of the requesting entity 207, or other criteria.

Once the user authenticates and provides consent for requesting entity 207 to access the recorded collaboration session, server 203 retrieves the encoded collaboration session data of the user at operation 210 and decodes the data using the unique key of the user. The decoded data can be provided to requesting entity 207 at operation 212. In some embodiments, a plurality of users may each independently approve or deny a request of requesting entity 207. Thus, requesting entity 207 may be provided with a recorded collaboration session that is fully decoded, partially decoded (e.g., some users may be seen and/or heard, whereas others may not be), or fully encoded (which may still be intelligible due to a non-encoded audio portion, a transcript, and the like).

Figure 3:
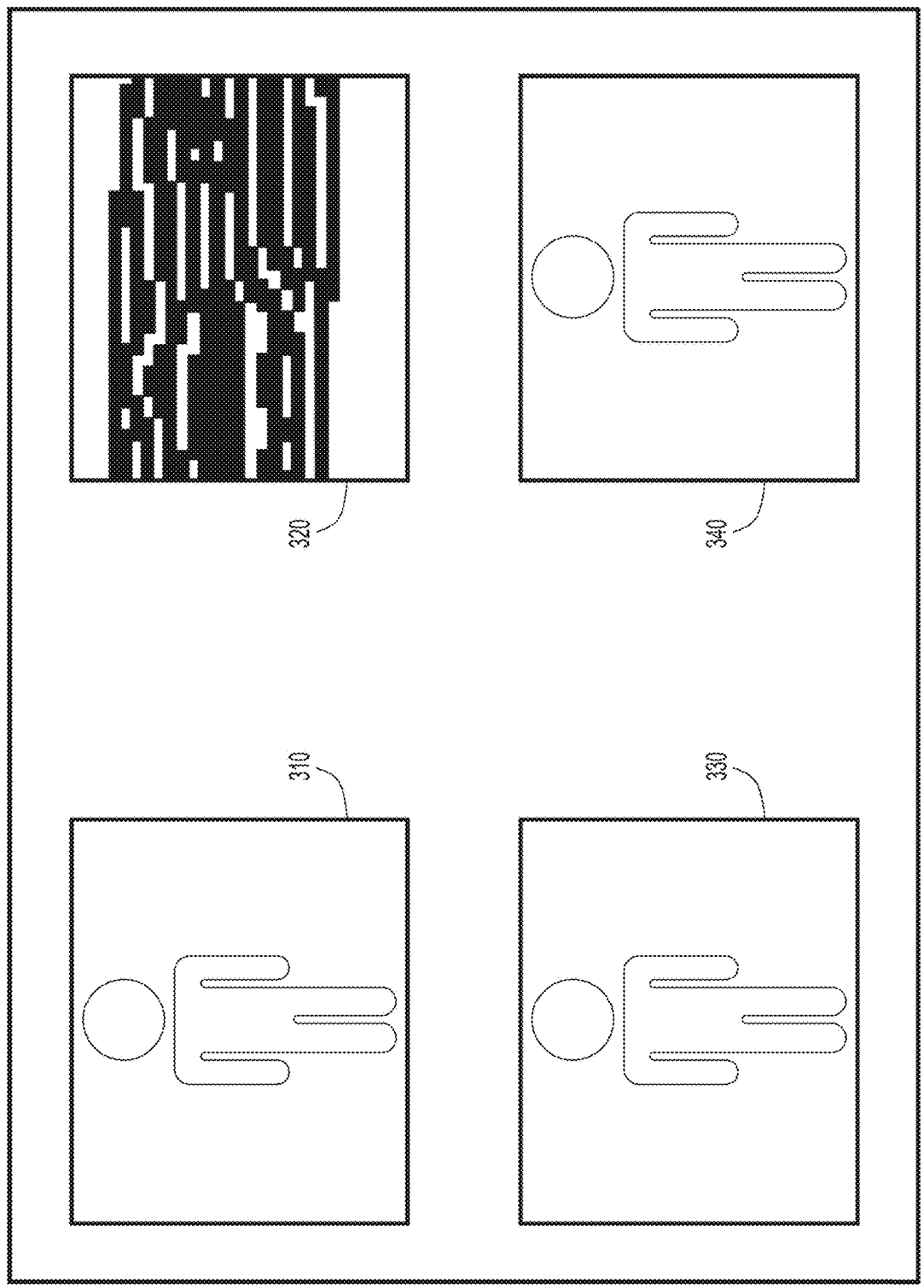
FIG. 3 is a diagram depicting a user interface for playback of a recorded collaboration session and illustrating how some video may be obfuscated during playback, according to an example embodiment.

With reference now to FIG. 3, is a diagram depicting a user interface 300, according to an example embodiment. As depicted, user interface 300 represents an interface for playback of a recorded collaboration session. User interface 300 includes a plurality of video windows 310-340, wherein each window may correspond to a particular user's video data (e.g., data collected by a webcam or other video camera during the collaboration session). In the depicted example, the entity requesting to view the collaboration session may obtain permission to view video data corresponding to the users depicted in windows 310, 330, and 340. Thus, decoded video data is presented for these users. However, the requesting entity may not have received permission from the user associated with window 320, or the user may have explicitly denied the requesting entity's request. Thus, window 320 presents a view in which a user's video data remains encoded and is thus unintelligible.

Figure 4:
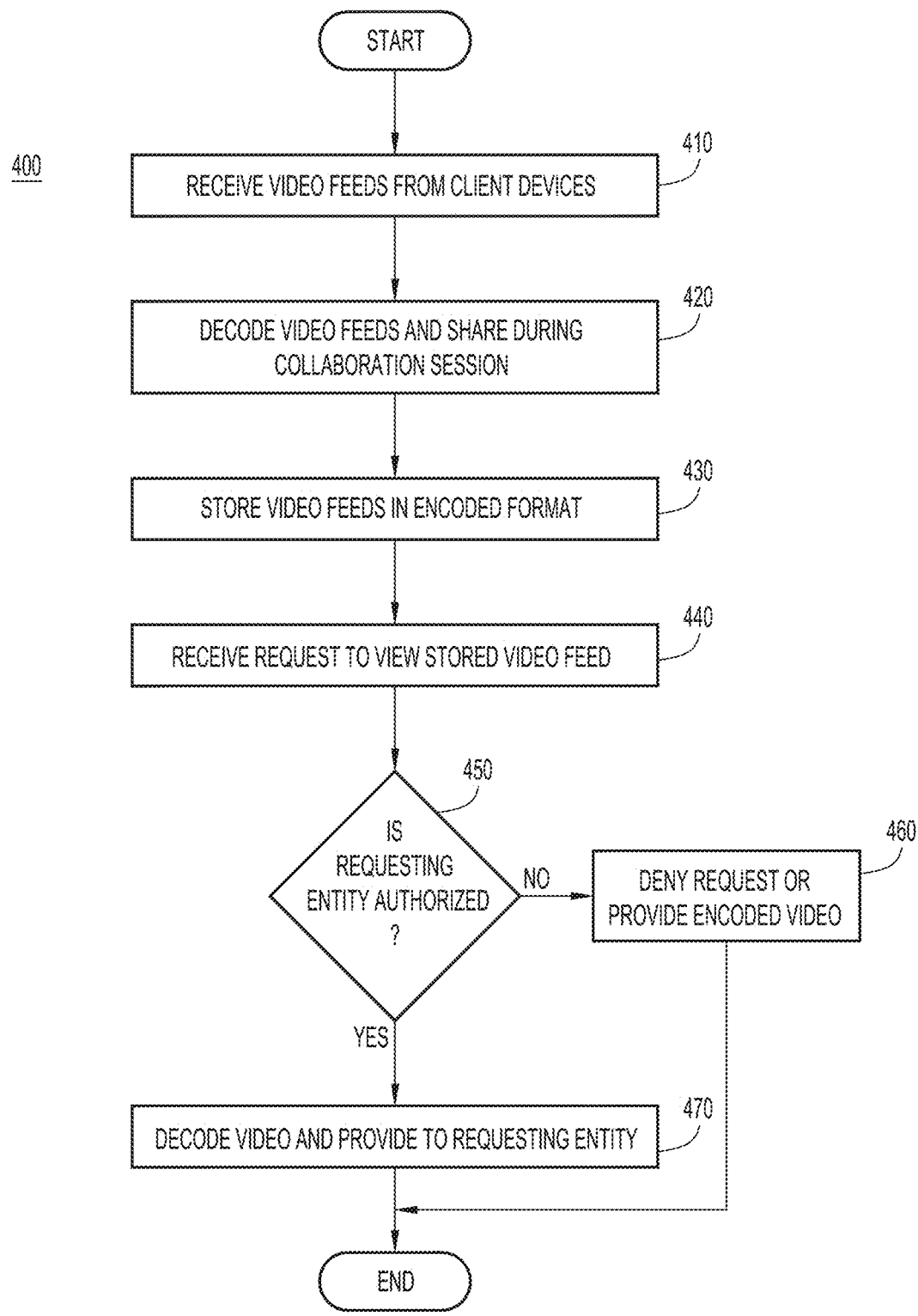
FIG. 4 is a flow chart of a method of securely storing a collaboration session video, according to an example embodiment.

FIG. 4 is a flow chart of a method 400 of securely storing a collaboration session video, according to an example embodiment.

Video feeds are received from client devices during a collaboration session at operation 410. Each video feed may include video data captured by a client device of a user (e.g., via a webcam or other camera) so that users can see each other during the collaboration session. Each video feed may initially be encoded using a unique key that is associated with the user corresponding to that video feed.

The video feeds are decoded and shared during the collaboration session at operation 420. A server that supports the collaboration session may temporarily decode each video feed using the corresponding keys so that the collaboration session can proceed. After the collaboration session has ended, the server may delete all of the unique keys.

The video feeds are stored in their encoded format at operation 430. Each video feed may be stored in its encoded format at a database, thus requiring a unique key to decode. The unique key may be retained by a user and/or may be managed by a key management service.

At operation 440, a request is received to view the recorded collaboration session. The requesting entity may request to view a particular recorded collaboration session. Each user feed in the session may be identified so that authorization may be sought from the corresponding users. Thus, a single request from a requesting entity may necessitate that a plurality of users each be individually requested to provide authorization for their own video feed to be decoded.

At operation 450, it is determined whether the requesting entity is authorized to view the video feed. For each user video feed in the recorded collaboration session, a determination may be made as to whether the user has provided consent for their video data to be decoded. In some embodiments, users may manually approve or disapprove on an ad hoc fashion. In other embodiments, users may stipulate access criteria for particular requesting entities and/or for predetermined durations of time.

If a user does not approve of the user's video feed being decoded, or if the user's unique key is otherwise unavailable, the request is denied and/or the encoded video data is provided to the requesting entity at operation 460. When a request is denied, the requesting entity may be informed. The requesting entity may nevertheless be provided with the encoded video data, which can be presented alongside other encoded and/or decoded video data as the requesting entity plays back the recorded collaboration session. However, if the requesting entity is authorized and the unique key is made available, then the video data is decoded and provided to the requesting entity at operation 470. Thus, a recorded collaboration session may be securely stored and accessed by a requesting entity.

Figure 5:
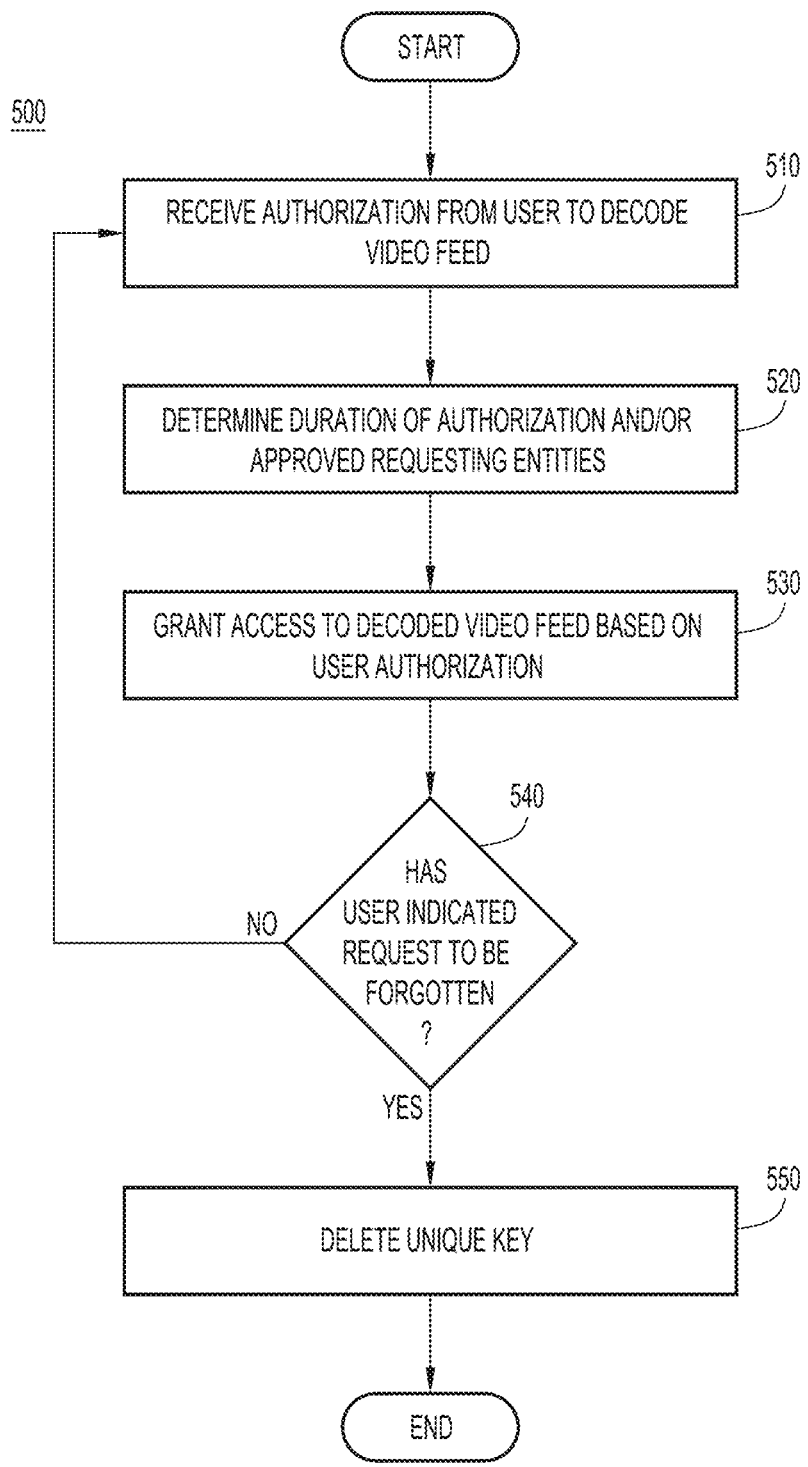
FIG. 5 is a flow chart of a method of authorizing playback of a recorded collaboration session, according to an example embodiment.

FIG. 5 is a flow chart of a method 500 of authorizing playback of a recorded collaboration session, according to an example embodiment.

Authorization is received from a user to decode a video feed at operation 510. A user may be notified that a requesting entity desires to view the user's video feed, and the user may authorize the video feed to be decoded. In some embodiments, a user may provide a standing authorization that acts as authorization as long as certain criteria are met, such as the requesting entity having a particular identity (e.g., a specific user) or role (e.g., a supervisor or administrator). The user can also stipulate a duration over which the user's authorization is provided (after which the authorization may expire). The authorization may thus be stored as metadata along with a user's unique key.

The duration of the authorization and/or the approved requesting entities are determined at operation 520. These details may be extracted from the metadata stored with the key, and compared to any data relating to a requesting entity in order to grant or deny access to the decoded video feed. Access may thus be granted to the decoded video feed based on the provided user authorization at operation 530. When access is granted, the decoded video feed may be generated by decoding the encoded video feed using the user's unique key. A decoded video feed may only remain available while a requesting entity plays back the recorded collaboration session, and may be subsequently deleted or otherwise rendered inaccessible after the requesting entity finishes playback.

Operation 540 determines whether the user has indicated a request to be forgotten. A user may indicate the user's request to be forgotten by transmitting a request to permanently delete the unique key, which is performed at operation 550. Thus, any data encoded using that unique key may be rendered permanently inaccessible, thus complying with the user's right to be forgotten. As long as the user has not indicated a request to be forgotten, the previously-stipulated access criteria may be applied for new requests, which may be received at operation 510.

Figure 6:
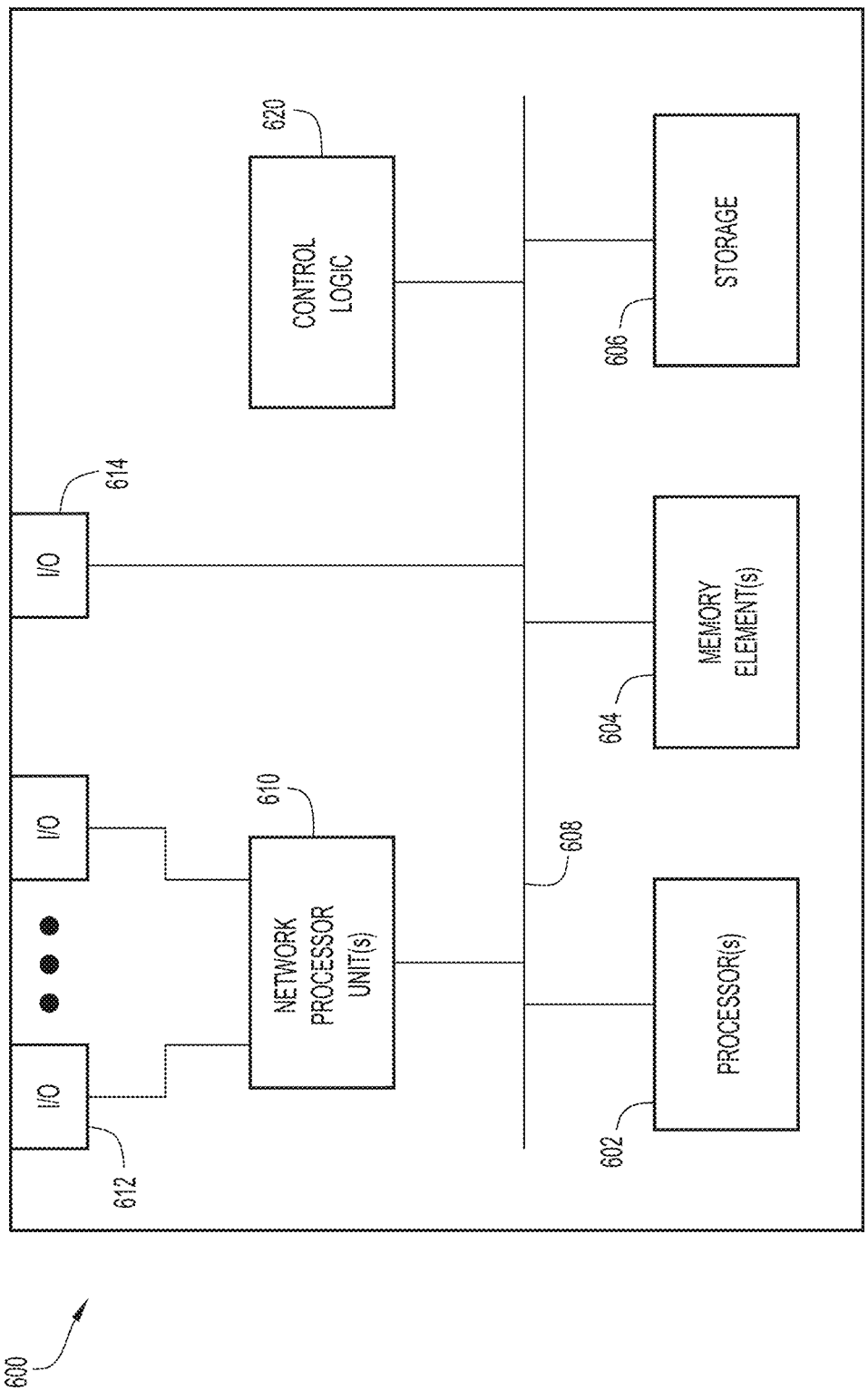
FIG. 6 is a block diagram of a device that may be configured to view a recorded collaboration session and/or to authorize playback of a recorded collaboration session, as presented herein.

Referring now to FIG. 6, FIG. 6 illustrates a hardware block diagram of a computing device 600 that may perform functions associated with operations discussed herein in connection with the techniques depicted in FIGS. 1-5. In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allow for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: receiving, at a server, a plurality of video feeds from a plurality of client devices of users participating in a video meeting, wherein each video feed is encoded by each client device in an encoded format that distorts the video feed, and wherein a unique key is used by each client device to encode the video feed; decoding the plurality of video feeds by the server using each respective unique key, and providing the decoded plurality of video feeds to the plurality of client devices during the video meeting; storing the plurality of video feeds in the encoded format; receiving a request from a requesting entity to view a stored video feed of the plurality of video feeds, wherein the request includes the unique key used to encode the stored video feed; and in response to determining that the requesting entity is authorized by a user of the stored video feed to view the stored video feed, decoding the stored video feed and providing to the requesting entity a decoded stored video feed obtained by decoding the stored video feed.

In some aspects, the techniques described herein relate to a computer-implemented method, wherein a key management server stores the unique key, and the method further including: obtaining an indication that the user provided authorization to the key management server to utilize the unique key for decoding the stored video feed that includes the user.

In some aspects, the techniques described herein relate to a computer-implemented method, further including obtaining from the user authorization for the requesting entity to view the stored video feed in response to receiving the request from the requesting entity.

In some aspects, the techniques described herein relate to a computer-implemented method, wherein decoding of the stored video feed is permanently prevented in response to receiving a request from the user to delete the unique key of the user.

In some aspects, the techniques described herein relate to a computer-implemented method, wherein the user providing authorization for the requesting entity permanently authorizes the requesting entity until the user revokes the authorization.

In some aspects, the techniques described herein relate to a computer-implemented method, wherein the user providing authorization for the requesting entity authorizes the requesting entity for a predetermined amount of time.

In some aspects, the techniques described herein relate to a computer-implemented method, wherein each video feed further includes an audio portion that is encoded using the unique key or a separate unique key, and wherein the unique key or the separate unique key is utilized to decode the audio portion.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: receive, at a server, a plurality of video feeds from a plurality of client devices of users participating in a video meeting, wherein each video feed is encoded by each client device in an encoded format that distorts the video feed, and wherein a unique key is used by each client device to encode the video feed; decode the plurality of video feeds by the server using each respective unique key, and providing the decoded plurality of video feeds to the plurality of client devices during the video meeting; store the plurality of video feeds in the encoded format; receive a request from a requesting entity to view a stored video feed of the plurality of video feeds, wherein the request includes the unique key used to encode the stored video feed; and in response to determining that the requesting entity is authorized by a user of the stored video feed to view the stored video feed, decode the stored video feed and providing to the requesting entity a decoded stored video feed obtained by decoding the stored video feed.

In some aspects, the techniques described herein relate to a computer system, wherein a key management server stores the unique key, and the program instructions further include instructions to: obtain an indication that the user provided authorization to the key management server to utilize the unique key for decoding the stored video feed that includes the user.

In some aspects, the techniques described herein relate to a computer system, wherein the program instructions further include instructions to obtain from the user authorization for the requesting entity to view the stored video feed in response to receiving the request from the requesting entity.

In some aspects, the techniques described herein relate to a computer system, wherein decoding of the stored video feed is permanently prevented in response to receiving a request from the user to delete the unique key of the user.

In some aspects, the techniques described herein relate to a computer system, wherein the user providing authorization for the requesting entity permanently authorizes the requesting entity until the user revokes the authorization.

In some aspects, the techniques described herein relate to a computer system, wherein the user providing authorization for the requesting entity authorizes the requesting entity for a predetermined amount of time.

In some aspects, the techniques described herein relate to a computer system, wherein each video feed further includes an audio portion that is encoded using the unique key or a separate unique key, and wherein the unique key or the separate unique key is utilized to decode the audio portion.

In some aspects, the techniques described herein relate to a computer program product including one or more computer readable storage media collectively having program instructions embodied therewith, the program instructions executable by a computer to cause the computer to perform operations including: receive, at a server, a plurality of video feeds from a plurality of client devices of users participating in a video meeting, wherein each video feed is encoded by each client device in an encoded format that distorts the video feed, and wherein a unique key is used by each client device to encode the video feed; decode the plurality of video feeds by the server using each respective unique key, and providing the decoded plurality of video feeds to the plurality of client devices during the video meeting; store the plurality of video feeds in the encoded format; receive a request from a requesting entity to view a stored video feed of the plurality of video feeds, wherein the request includes the unique key used to encode the stored video feed; and in response to determining that the requesting entity is authorized by a user of the stored video feed to view the stored video feed, decode the stored video feed and providing to the requesting entity a decoded stored video feed obtained by decoding the stored video feed.

In some aspects, the techniques described herein relate to a computer program product, wherein a key management server stores the unique key, and the program instructions further cause the computer to: obtain an indication that the user provided authorization to the key management server to utilize the unique key for decoding the stored video feed that includes the user.

In some aspects, the techniques described herein relate to a computer program product, wherein the program instructions further cause the computer to obtain from the user authorization for the requesting entity to view the stored video feed in response to receiving the request from the requesting entity.

In some aspects, the techniques described herein relate to a computer program product, wherein decoding of the stored video feed is permanently prevented in response to receiving a request from the user to delete the unique key of the user.

In some aspects, the techniques described herein relate to a computer program product, wherein the user providing authorization for the requesting entity permanently authorizes the requesting entity until the user revokes the authorization.

In some aspects, the techniques described herein relate to a computer program product, wherein the user providing authorization for the requesting entity authorizes the requesting entity for a predetermined amount of time.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   receiving, at a server, a plurality of video feeds from a plurality of client devices of users participating in a video meeting, wherein each video feed is encoded by each client device in an encoded format that distorts the video feed, and wherein a unique key is used by each client device to encode the video feed;
   decoding the plurality of video feeds by the server using each respective unique key, and providing the decoded plurality of video feeds to the plurality of client devices during the video meeting;
   storing the plurality of video feeds in the encoded format;
   receiving a request from a requesting entity to view a stored video feed of the plurality of video feeds, wherein the request includes the unique key used to encode the stored video feed; and
   in response to determining that the requesting entity is authorized by a user of the stored video feed to view the stored video feed, decoding the stored video feed and providing to the requesting entity a decoded stored video feed obtained by decoding the stored video feed.

2. The computer-implemented method of claim 1, wherein a key management server stores the unique key, and the method further comprising:
   obtaining an indication that the user provided authorization to the key management server to utilize the unique key for decoding the stored video feed that includes the user.

3. The computer-implemented method of claim 1, further comprising obtaining from the user authorization for the requesting entity to view the stored video feed in response to receiving the request from the requesting entity.

4. The computer-implemented method of claim 1, wherein decoding of the stored video feed is permanently prevented in response to receiving a request from the user to delete the unique key of the user.

5. The computer-implemented method of claim 1, wherein the user providing authorization for the requesting entity permanently authorizes the requesting entity until the user revokes the authorization.

6. The computer-implemented method of claim 1, wherein the user providing authorization for the requesting entity authorizes the requesting entity for a predetermined amount of time.

7. The computer-implemented method of claim 1, wherein each video feed further includes an audio portion that is encoded using the unique key or a separate unique key, and wherein the unique key or the separate unique key is utilized to decode the audio portion.

8. A computer system comprising:
one or more computer processors;
one or more computer readable storage media; and
program instructions stored on the one or more computer readable storage media for execution by at least one of the one or more computer processors, the program instructions comprising instructions to:
receive, at a server, a plurality of video feeds from a plurality of client devices of users participating in a video meeting, wherein each video feed is encoded by each client device in an encoded format that distorts the video feed, and wherein a unique key is used by each client device to encode the video feed;
decode the plurality of video feeds by the server using each respective unique key, and providing the decoded plurality of video feeds to the plurality of client devices during the video meeting;
store the plurality of video feeds in the encoded format;
receive a request from a requesting entity to view a stored video feed of the plurality of video feeds, wherein the request includes the unique key used to encode the stored video feed; and
in response to determining that the requesting entity is authorized by a user of the stored video feed to view the stored video feed, decode the stored video feed and providing to the requesting entity a decoded stored video feed obtained by decoding the stored video feed.

9. The computer system of claim 8, wherein a key management server stores the unique key, and the program instructions further comprise instructions to:
obtain an indication that the user provided authorization to the key management server to utilize the unique key for decoding the stored video feed that includes the user.

10. The computer system of claim 8, wherein the program instructions further comprise instructions to obtain from the user authorization for the requesting entity to view the stored video feed in response to receiving the request from the requesting entity.

11. The computer system of claim 8, wherein decoding of the stored video feed is permanently prevented in response to receiving a request from the user to delete the unique key of the user.

12. The computer system of claim 8, wherein the user providing authorization for the requesting entity permanently authorizes the requesting entity until the user revokes the authorization.

13. The computer system of claim 8, wherein the user providing authorization for the requesting entity authorizes the requesting entity for a predetermined amount of time.

14. The computer system of claim 8, wherein each video feed further includes an audio portion that is encoded using the unique key or a separate unique key, and wherein the unique key or the separate unique key is utilized to decode the audio portion.

15. A computer program product comprising one or more computer readable storage media collectively having program instructions embodied therewith, the program instructions executable by a computer to cause the computer to perform operations including:
receive, at a server, a plurality of video feeds from a plurality of client devices of users participating in a video meeting, wherein each video feed is encoded by each client device in an encoded format that distorts the video feed, and wherein a unique key is used by each client device to encode the video feed;
decode the plurality of video feeds by the server using each respective unique key, and providing the decoded plurality of video feeds to the plurality of client devices during the video meeting;
store the plurality of video feeds in the encoded format;
receive a request from a requesting entity to view a stored video feed of the plurality of video feeds, wherein the request includes the unique key used to encode the stored video feed; and
in response to determining that the requesting entity is authorized by a user of the stored video feed to view the stored video feed, decode the stored video feed and providing to the requesting entity a decoded stored video feed obtained by decoding the stored video feed.

16. The computer program product of claim 15, wherein a key management server stores the unique key, and the program instructions further cause the computer to:
obtain an indication that the user provided authorization to the key management server to utilize the unique key for decoding the stored video feed that includes the user.

17. The computer program product of claim 15, wherein the program instructions further cause the computer to obtain from the user authorization for the requesting entity to view the stored video feed in response to receiving the request from the requesting entity.

18. The computer program product of claim 15, wherein decoding of the stored video feed is permanently prevented in response to receiving a request from the user to delete the unique key of the user.

19. The computer program product of claim 15, wherein the user providing authorization for the requesting entity permanently authorizes the requesting entity until the user revokes the authorization.

20. The computer program product of claim 15, wherein the user providing authorization for the requesting entity authorizes the requesting entity for a predetermined amount of time.

* * * * *